United States Patent [19]
Faitel

[11] Patent Number: 5,130,584
[45] Date of Patent: Jul. 14, 1992

[54] SLIDE WITH SYNCHRONIZED DRIVE WITH SLIP CLUTCH

[75] Inventor: William M. Faitel, Oxford, Mich.

[73] Assignee: Litton Industrial Automation Systems, Inc., Florence, Ky.

[21] Appl. No.: 741,138

[22] Filed: Aug. 7, 1991

[51] Int. Cl.⁵ .......................................... H02K 33/00
[52] U.S. Cl. .................................. 310/17; 310/15; 310/68 B; 318/127
[58] Field of Search ............... 310/15, 17, 68 B, 68 E, 310/94, 96; 318/119, 126, 127, 128

[56] References Cited

U.S. PATENT DOCUMENTS

| | | | |
|---|---|---|---|
| 4,778,353 | 10/1988 | Wiernicki | 417/53 |
| 5,052,424 | 10/1991 | Zerndt et al. | 137/1 |
| 5,063,316 | 11/1991 | E-Ming | 310/83 |

FOREIGN PATENT DOCUMENTS 636749 12/1978 U.S.S.R. .................... 310/17

Primary Examiner—Steven L. Stephan
Assistant Examiner—Judson H. Jones
Attorney, Agent, or Firm—Barnes, Kisselle, Raisch, Choates, Whittemore & Hulbert

[57] ABSTRACT

A synchronized drive for a slide with a slip clutch which dissipates excess energy in an overload or crash situation to prevent damage to the mechanism. The slip clutch is coupled between a servo motor and a gear reducer to dissipate excessive force during a crash or an overload condition. A position feedback transducer is coupled to the gear reduced downstream of the clutch to maintain synchronization, even after a crash or overload condition, without requiring any re-homing sequence.

3 Claims, 3 Drawing Sheets

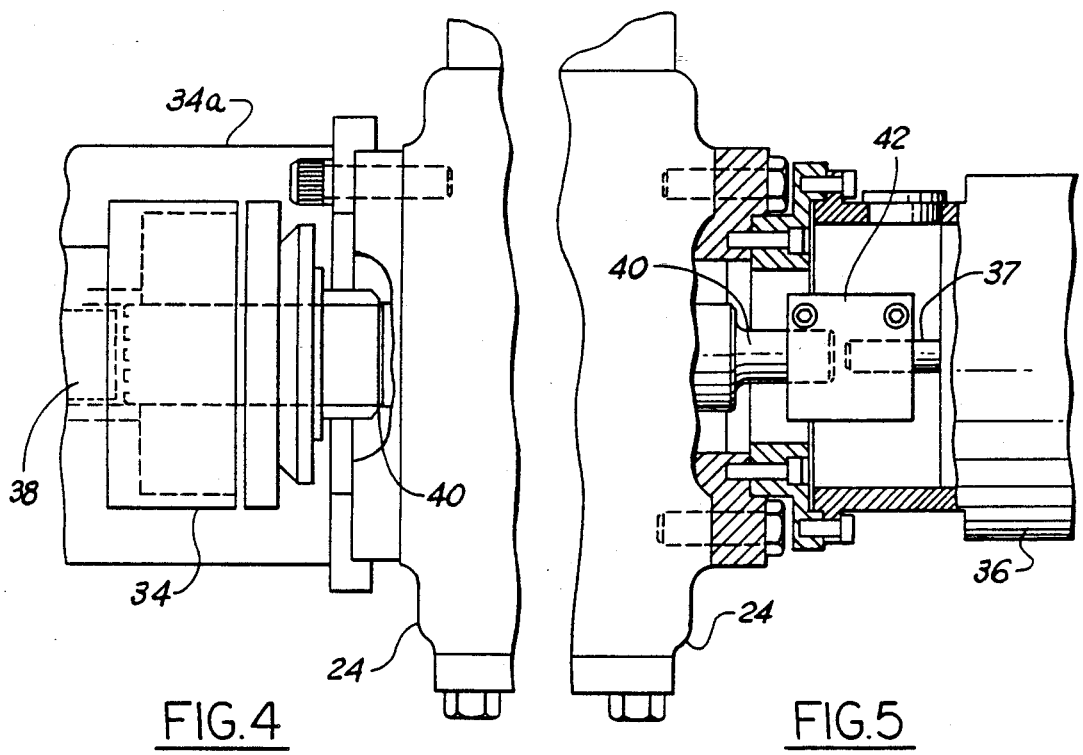

SLIDE WITH SYNCHRONIZED DRIVE WITH SLIP CLUTCH

FIELD OF THE INVENTION

This invention relates to a synchronized servo drive for a slide, conveyor or like systems and more particularly to a servo drive arrangement that will dissipate excess energy of the motor during an overload or crash situation and remains synchronized with the system after an overload or crash situation has occurred without the use of a programmed homing sequence.

BACKGROUND OF THE INVENTION

Servo drive mechanisms for slides, conveyors and like systems have been known and some provide limited crash protection by having a drive that is sturdy or compliant enough to survive an abrupt stop caused by a crash or other abnormal conditions. These prior servo drive mechanisms require brakes, electrical switches and programmed homing sequences to shut the system down and to resynchronized it for further use. A variety of arrangements with motor transducers, motor brakes, load transducers, load brakes and single position detent clutches have been used to provide limited crash protection. The high cost and complexity of such devices make improvements desirable in the area of economy, simplicity and reliability.

BRIEF SUMMARY OF THE INVENTION

A slip clutch is coupled between a motor and gear reducer to dissipate excess energy from the motor during a crash. Synchronization of the system is maintained by a position sensor coupled to the gear reducer. This provides continuous and absolute positioning of the system thus eliminating the need for a homing sequence. The slip clutch eliminates the need for a brake unit. Additionally, electrical feedback for determining whether or not the clutch is engaged is not required.

Objects, features and advantages of this invention are to provide a synchronized drive for a slide, conveyer and like systems which dissipates the load in a crash situation, remains synchronized with the slide or conveyer device after a crash has occurred, and is rugged, durable, highly reliable, of simplified design and economical manufacture and assembly.

BRIEF DESCRIPTION OF THE DRAWINGS

The invention, together with additional objects, features and advantages thereof, will best be understood from the following detailed description, appended claims and the accompanying drawings in which:

FIG. 4 is an enlarged and fragmentary view of the encircled portion 4 of FIG 3;

FIG. 5 is an enlarged and fragmentary view partially in section of the encircled portion 5 of FIG. 3.

DETAILED DESCRIPTION OF THE PREFERRED EMBODIMENT

Figure 1:
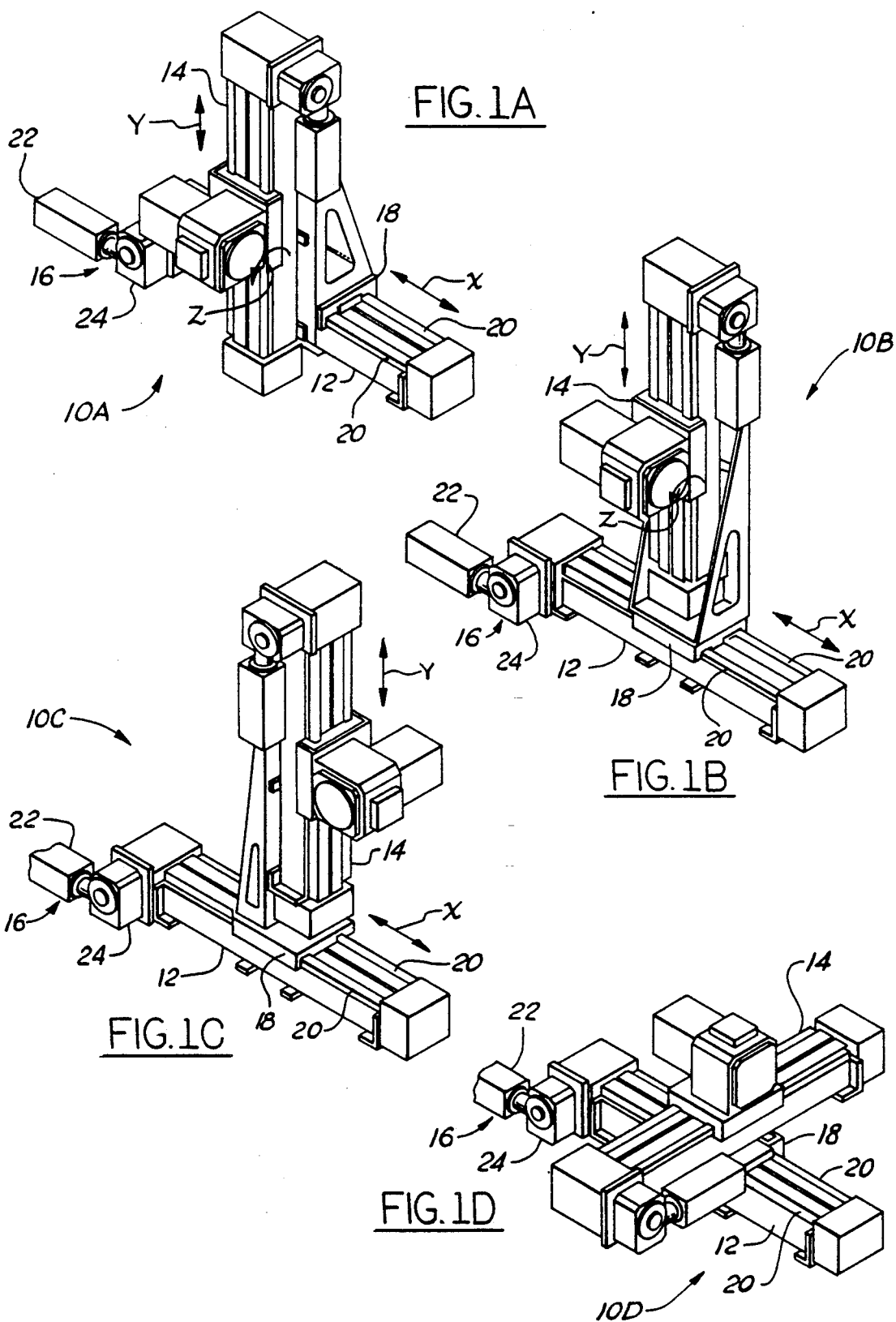
FIGS. 1A-1D are perspective views of various arrangements of a transfer mechanism with a slide driven by a synchronized servo drive.

FIGS. 1A-1D illustrate transfer mechanisms 10A-10D with reciprocating slides driven by synchronized servo drives. These mechanisms typically are designed to operate with more than one axis of movement such as orthogonal axes X and Y and rotary axis Z.

Each transfer mechanism has a reciprocating slide 12 and 14 for movement along X and Y axes driven by a servo drive 16. Each slide has a carriage 18 slidably received on ways 20 and driven by a reversible electric motor 22 through a gear reducer 24 and a belt 26 received on suitable pulleys. A position feedback transducer continuously communicates carriage position to a controller. When the carriage 18 reaches either end of its programmed stroke, the controller then reverses the servo motor to move the carriage in the reverse direction to the next commanded position. During movement of the carriage, a crash or overload condition may occur due to an obstruction or operator error.

Figure 2:
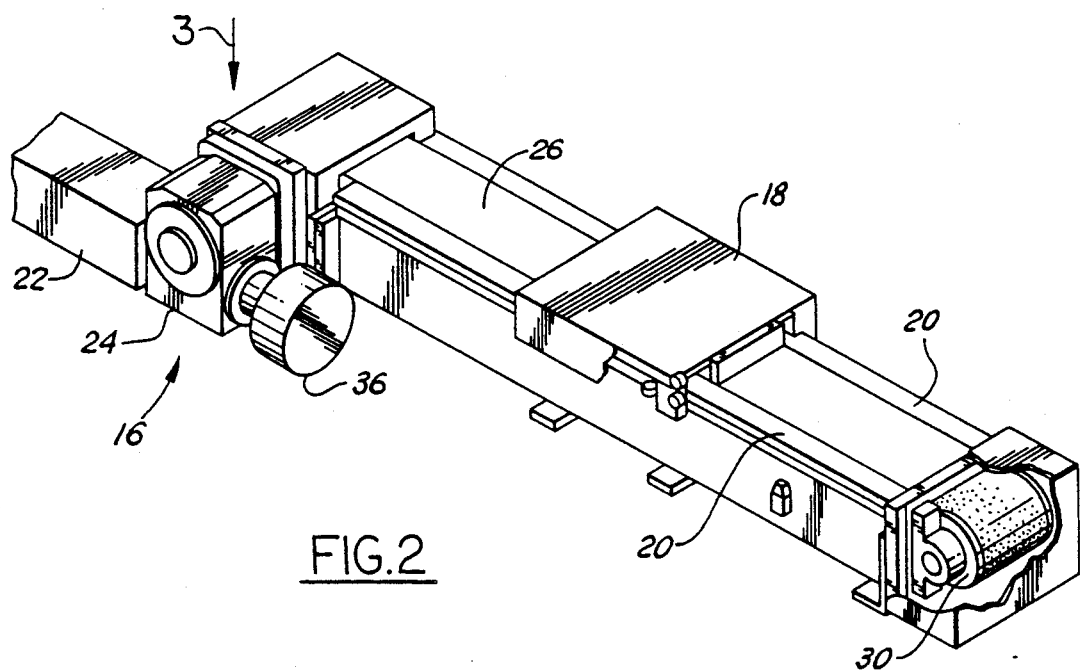
FIG. 2 is a perspective view of a slide mechanism with a synchronized servo drive embodying the invention.
Figure 3:
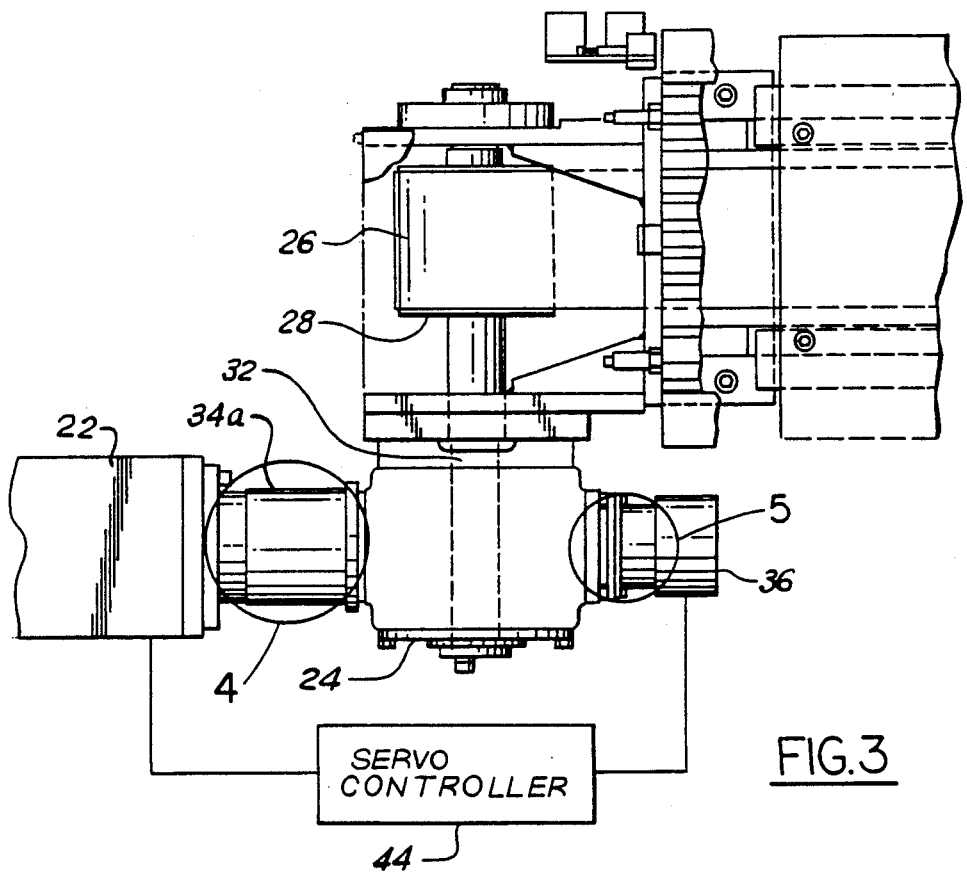
FIG. 3 is a fragmentary plan view taken along line 3 in FIG. 2.

FIGS. 2-5 illustrate in greater detail one of the slide mechanisms 12 and 14 with a servo drive 16 embodying this invention. As shown in FIGS. 2 and 3, the carriage 18 is connected to a timing belt 26 for longitudinal reciprocation along the ways 20. The timing belt is received over drive and idler cog rollers 28 and 30 mounted for rotation adjacent opposite ends of the ways. As shown in FIG. 3, the drive roller 28 is connected to the output shaft 32 of the gear reducer for rotation therewith.

As shown in FIGS. 2 and 3, the servo drive 16 is constructed in accordance with this invention to obviate the problems of excessive force caused by a crash and maintains synchronization of the drive with the system. To obviate this excessive force, the motor is connected by a slip clutch 34 mounted in a housing 34a to the gear reducer. To provide synchronization, a positioning feed back transducer 36 directly coupled to the gear reducer 24 downstream of the clutch so that it will always reflect the actual position of the carriage.

As shown in FIG. 4, the slip clutch is directly connected to the output shaft 38 of the motor and the input shaft 40 of the gear reducer. The slip clutch limits the maximum torque to which the gear reducer can be subjected and hence the maximum load on the carriage in a crash condition to a low enough value to prevent damage to the drive system. Because the clutch is of the "slip" type, it continuously provides a yieldably biased connection between the motor and the carriage which eliminate the need for any brake mechanism in the drive system. Preferably, the amount of torque or load at which the clutch begins to slip can be adjusted. This permits the point at which the clutch begins to slip to be adjusted for different applications so that it is below the point at which the system would be damaged in a crash and above the point of normal operating conditions. A suitable slip clutch is commercially available from the Carlyle Johnson Machine Company of Manchester, Conn. 06040 under the trade name MAXITORQ. These clutches are adjustable and come in a wide torque range from about 1 to 1500 foot pounds.

As shown in FIG. 5, the output shaft 37 of the feed back transducer 36 is directly coupled to the input shaft 40 of the gear reducer, preferably through a so-called "flexible" coupling 42 which tends to isolate the transducer from vibration transmitted through the input shaft but does not permit relative rotation between the input shaft and the transducer. The coupling 42 also allows for misalignment between the gear reducer input shaft 40 and the feedback transducer output shaft 37. A suitable transducer is commercially available from Allen Bradley Corporation of 1201 South Second Street, Milwaukee, Wis. 53204, such as the Allen Bradley Dual Resolver No. 1326AB-MOD-VC255. Suitable reversible servo drive motors are also available from Allen Bradley. A suitable coupling is available from Micron Corporation of 50 Alexander Court, Ronkonkoma, N.Y. 11779-6575 as Micron Flexible Coupling No. 41-2-10.

In operation, as the carriage 18 is moved in either direction along ways 20 by the drive 16, the drive roller 28 is rotated by the drive motor 22 through the slip clutch 34 and gear reducer 24. The position feedback transducer 36 keeps track of the actual position of the carriage 18 and feeds a signal containing this information to a servo controller 44 which controls the motor 22. The controller 44 has algorithms which compute the theoretical or "command" position of the carriage. For computing the theoretical position, typically the carriage acceleration rate, peak traveling speed, starting point, and end point data are given or specified as input data which the controller utilizes to calculate a theoretical position curve relative to elapsed time from the starting position. The controller compares the calculated theoretical position with the actual position of the carriage indicated by the feedback transducer and determine any following error. The controller is of the type available from Allen Bradley Corporation selected from the Allen Bradley IMC Family Series 120, 121 and 123. In normal operation, the controller varies and adjusts as needed the current supply to the servo motor to minimize the following error and thereby conform the actual position of the carriage to the desired theoretical or commanded position. The maximum following error which is acceptable during normal operating conditions is also user specified and provided to the controller 44.

In a crash situation, the drive pulley 28 is stalled which rapidly causes excessive torque between the motor 22 and the drive pulley 28 so that the clutch slips thereby preventing an excessive load or force from being transmitted to the carriage. Since the carriage is not moving, the following error determined by the controller 44 rapidly exceeds the maximum acceptable value which causes the controller to instantly shut off the motor 22 thereby shut down the system. Since the position feedback transducer 36 is directly connected to the gear reducer 24, even though the clutch 34 slips and dissipates excessive motor energy, the position transducer 34 remains synchronized with the carriage 18 and thus does not require any re-homing.

Advantageously the servo drive of the present invention is simple, economical and highly reliable. The slip clutch provides greater sensiveity to an abrupt crash and dissipates the excessive energy which would otherwise be transmitted to the load. Complex arrangements of prior servo drives are avoided by eliminating the need for brakes and electrical feedback for determining whether or not the clutch is engaged as is required for single detent clutch mechanisms. Direct and continuous synchronization between the position feedback sensor transducer and the carriage eliminates the need for a homing sequence.

I claim:

1. A synchronized drive for a reciprocating linear slide device having, a carriage, support means supporting said carriage for movement along a linear path, a drive roller mounted adjacent one end of said support means, an idler roller mounted adjacent the opposite end of said support means, and a flexible drive member looped around said drive roller and said idler roller and connected to said carriage, and comprising, a motor operably connected to said drive roller, a slip clutch coupled between said motor and said drive roller for dissipating excessive motor energy, a position sensing means operably connected with said carriage downstream of said slip clutch and which produces a signal proportional to the displacement of said carriage, a control means for establishing a theoretical carriage position and a following error limit based on input parameters, said control means receiving said carriage signal from said position sensing means and comparing said carriage signal to said theoretical position to determine an actual following error, such that, upon carriage overload, said control means compares said actual following error with said following error limit and shuts off the motor when said actual following error exceeds said following error limit, and wherein said slip clutch allows said motor to slip relative to said carriage so that said position sensing means always remains synchronized with said carriage.

2. A synchronized servo drive for a linear slide mechanism having a driver comprising, a motor operably connected to said driver, a slip clutch coupled between said motor and said driver for dissiptating excessive motor energy, a position sensing means operably connected with said slide downstream of said slip clutch and which produces a position signal proportional to the displacement of said slide, a control means for establishing a theoretical slide position and a following error limit based on input parameters, said control means receiving said position signal from said position sensing means and comparing said position signal to said theoretical position to determine an actual following error, such that, upon slide overload, said control means compares said actual following error with said following error limit and shuts off the motor when said actual following error exceeds said following error limit, and wherein said slip clutch allows said motor to slip relative to said slide so that said position sensing means always remains synchronized with said slide.

3. A method of driving a reciprocating device and synchronizing said drive therewith comprising the steps of providing a drive for said device, operably coupling a motor with said drive, connecting a slip clutch between said motor and said drive for dissipating excess motor energy, providing a position sensing means connected to said device downstream of said slip clutch to be continuously synchronized therewith, producing a position signal proportional to the displacement of said device, providing a control means for computing a theoretical position of said device and for establishing a following error limit based on input parameters, providing said position signal to said control means, comparing said theoretical position with said position signal and calculating a following error, and shutting off said motor when said following error exceeds said following error limit.

* * * * *